US008683221B2

United States Patent
Peet, Jr. et al.

(10) Patent No.: US 8,683,221 B2
(45) Date of Patent: Mar. 25, 2014

(54) CONFIGURABLE MEMORY ENCRYPTION WITH CONSTANT PIPELINE DELAY IN A MULTI-CORE PROCESSOR

(75) Inventors: Charles Edward Peet, Jr., Austin, TX (US); Michael Betker, Orefield, PA (US)

(73) Assignee: LSI Corporation, Milpitas, CA (US)

( * ) Notice: Subject to any disclaimer, the term of this patent is extended or adjusted under 35 U.S.C. 154(b) by 154 days.

(21) Appl. No.: 13/274,726

(22) Filed: Oct. 17, 2011

(65) Prior Publication Data
US 2012/0036351 A1 Feb. 9, 2012

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(51) Int. Cl.
*G06F 11/30* (2006.01)
*G06F 15/76* (2006.01)

(52) U.S. Cl.
USPC ............... 713/189; 713/150; 712/28; 712/29

(58) Field of Classification Search
USPC .................................. 713/150, 189; 380/33
See application file for complete search history.

(56) References Cited

U.S. PATENT DOCUMENTS

| | | | |
|---|---|---|---|
| 4,622,631 A | 11/1986 | Frank et al. | |
| 5,623,698 A | 4/1997 | Stephenson et al. | |
| 5,825,878 A * | 10/1998 | Takahashi et al. | 713/190 |
| 5,892,766 A | 4/1999 | Wicki et al. | |
| 5,943,283 A | 8/1999 | Wong et al. | |
| 6,038,630 A | 3/2000 | Foster et al. | |
| 6,195,335 B1 | 2/2001 | Calvignac et al. | |
| 6,567,564 B1 | 5/2003 | van der Wal | |
| 6,636,932 B1 | 10/2003 | Regev et al. | |
| 7,089,346 B2 | 8/2006 | Cebulla et al. | |
| 7,096,370 B1 * | 8/2006 | Klein | 713/193 |
| 7,234,018 B1 | 6/2007 | Purcell et al. | |
| 7,334,178 B1 * | 2/2008 | Aulagnier | 714/758 |
| 7,461,208 B1 | 12/2008 | Caprioli et al. | |
| 7,461,407 B2 | 12/2008 | Little et al. | |
| 7,596,142 B1 | 9/2009 | MacAdam | |
| 7,694,152 B2 * | 4/2010 | Carr | 713/189 |

(Continued)

FOREIGN PATENT DOCUMENTS

JP   H02-271444   11/1990

*Primary Examiner* — Linglan Edwards

(57) ABSTRACT

Described embodiments provide a method of coordinating debugging operations in a network processor. The network processor has one or more processing modules. A system cache of the network processor requests a data transfer between the system cache and at least one external memory. A memory interface of the network processor selects an encrypted data pipeline or a non-encrypted data pipeline based on whether the processed data transfer request includes an encrypted operation. If the data transfer request includes an encrypted operation, the memory interface provides the data transfer to the encrypted data pipeline and checks whether a debug indicator is set for the data transfer request. If the debug indicator is set, the memory interface disables encryption/decryption of the encrypted data pipeline. The data transfer request is performed by the encrypted data pipeline to the at least one external memory.

18 Claims, 4 Drawing Sheets

(56) References Cited

U.S. PATENT DOCUMENTS

| | | | |
|---|---|---|---|
| 7,779,273 B2 * | 8/2010 | Dale et al. | 713/189 |
| 7,849,315 B2 | 12/2010 | Hardy et al. | |
| 7,886,150 B2 | 2/2011 | Stollon et al. | |
| 8,271,805 B2 * | 9/2012 | Yasue | 713/194 |
| 2002/0029214 A1 | 3/2002 | Yianilos et al. | |
| 2002/0122671 A1 * | 9/2002 | Yoshimura | 399/12 |
| 2002/0165985 A1 | 11/2002 | Chen et al. | |
| 2003/0033276 A1 | 2/2003 | Cheng et al. | |
| 2003/0115417 A1 | 6/2003 | Corrigan | |
| 2003/0123468 A1 | 7/2003 | Nong | |
| 2004/0255209 A1 | 12/2004 | Gross | |
| 2005/0027920 A1 | 2/2005 | Fitzsimmons et al. | |
| 2005/0152352 A1 | 7/2005 | Jun et al. | |
| 2006/0256783 A1 | 11/2006 | Ayrapetian et al. | |
| 2007/0016756 A1 | 1/2007 | Hsieh et al. | |
| 2007/0016835 A1 * | 1/2007 | Hronik et al. | 714/727 |
| 2007/0226798 A1 | 9/2007 | Sibert | |
| 2008/0162793 A1 | 7/2008 | Chu et al. | |
| 2009/0019270 A1 | 1/2009 | Halter et al. | |
| 2009/0132827 A1 * | 5/2009 | Little et al. | 713/183 |
| 2010/0260198 A1 | 10/2010 | Rojas-Cessa et al. | |

* cited by examiner

CONFIGURABLE MEMORY ENCRYPTION WITH CONSTANT PIPELINE DELAY IN A MULTI-CORE PROCESSOR

CROSS-REFERENCE TO RELATED APPLICATIONS

This application is a continuation-in-part, and claims the benefit of the filing date, of U.S. patent application Ser. Nos. 12/782,379 filed May 18, 2010, 12/782,393 filed May 18, 2010 now U.S. Pat. No. 8,255,644, and 12/782,411 filed May 18, 2010 U.S. Pat. No. 8,407,707, the teachings of which are incorporated herein in their entireties by reference.

The subject matter of this application is related to U.S. patent application Ser. Nos. 12/430,438 filed Apr. 27, 2009, 12/729,226 filed Mar. 22, 2010, 12/729,231 filed Mar. 22, 2010, 12/963,895 filed Dec. 9, 2010, 12/971,742 filed Dec. 17, 2010, 12/974,477 filed Dec. 21, 2010, 12/975,823 filed Dec. 22, 2010, 12/975,880 filed Dec. 22, 2010, 12/976,045 filed Dec. 22, 2010, 12/976,228 filed Dec. 22, 2010, 12/979,551 filed Dec. 28, 2010, 12/979,665 filed Dec. 28, 2010, 12/979,800 filed Dec. 28, 2010, 13/046,717 filed Mar. 12, 2011, 13/046,719 filed Mar. 12, 2011, 13/046,726 filed Mar. 12, 2011, 13/192,104 filed Jul. 27, 2011, 13/192,140 filed Jul. 27, 2011, 13/192,187 filed Jul. 27, 2011, 13/232,422 filed Sep. 14, 2011, and 13/250,898 filed Sep. 30, 2011, the teachings of which are incorporated herein in their entireties by reference.

BACKGROUND OF THE INVENTION

1. Field of the Invention

The present invention relates to communication systems, in particular, to operations for testing encryption and decryption datapaths of an accelerated processor architecture for packet networks.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors diminished performance improvements, or actually slowed down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed-pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence. In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by using the accelerators.

Network processors implemented as a system on chip (SoC) having multiple processing modules might typically employ an external memory device to store packet and other data. Some network processors might encrypt data stored on the external memory, thus, the SoC might include an encryption and decryption pipeline for encrypting data for storage on the external memory, and for decrypting data for use by the network processor. The SoC might also employ a non-encrypted pipeline for reading and writing non-encrypted data to and from the external memory. Since it takes relatively longer to send data through the encryption/decryption pipeline than through the non-encrypted pipeline, one or more register stages might be implemented in the encryption/decryption pipeline to buffer data during encryption and decryption operations. Typical debugging operations of the SoC might simply disable encryption/decryption, which might then bypass the encryption logic and register stages, potentially causing signal timing problems or masking problems in the encryption/decryption pipeline. Thus, there is a need for an improved debugging operation of an encryption/decryption pipeline of an SoC.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of coordinating debugging operations in a network processor. The network processor has one or more processing modules. A system cache of the network processor requests a data transfer between the system cache and at least one external memory. A memory interface of the network processor selects an encrypted data pipeline or a non-encrypted data pipeline based on whether the processed data transfer request includes an encrypted operation. If the data transfer request includes an encrypted operation, the memory interface provides the data transfer to the encrypted data pipeline and checks whether a debug indicator is set for the data transfer request. If the debug indicator is set, the memory interface disables encryption/decryption of the encrypted data pipeline. The data transfer request is performed by the encrypted data pipeline to the at least one external memory.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Described embodiments of the present invention provide for encrypted and non-encrypted operations and debugging operations between an internal memory of a system on chip (SoC) and an external memory of the SoC.

Table 1 defines a list of acronyms employed throughout this specification as an aid to understanding the described embodiments of the present invention:

TABLE 1

| | | | |
|---|---|---|---|
| USB | Universal Serial Bus | FIFO | First-In, First-Out |
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SRIO | Serial RapidIO | CPU | Central Processing Unit |
| SoC | System-on-Chip | μP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | SED | Stream Editor |
| MTM | Modular Traffic Manager | | |
| TCP | Transmission Control Protocol | CRC | Cyclic Redundancy Check |
| API | Application Programming Interfaces | UART | Universal Asynchronous Receiver/Transmitter |
| SWD | Serial Wire Debug | JTAG | Joint Test Action Group |
| IP | Internet Protocol | SLIP | Serial Line Internet Protocol |

Figure 1:
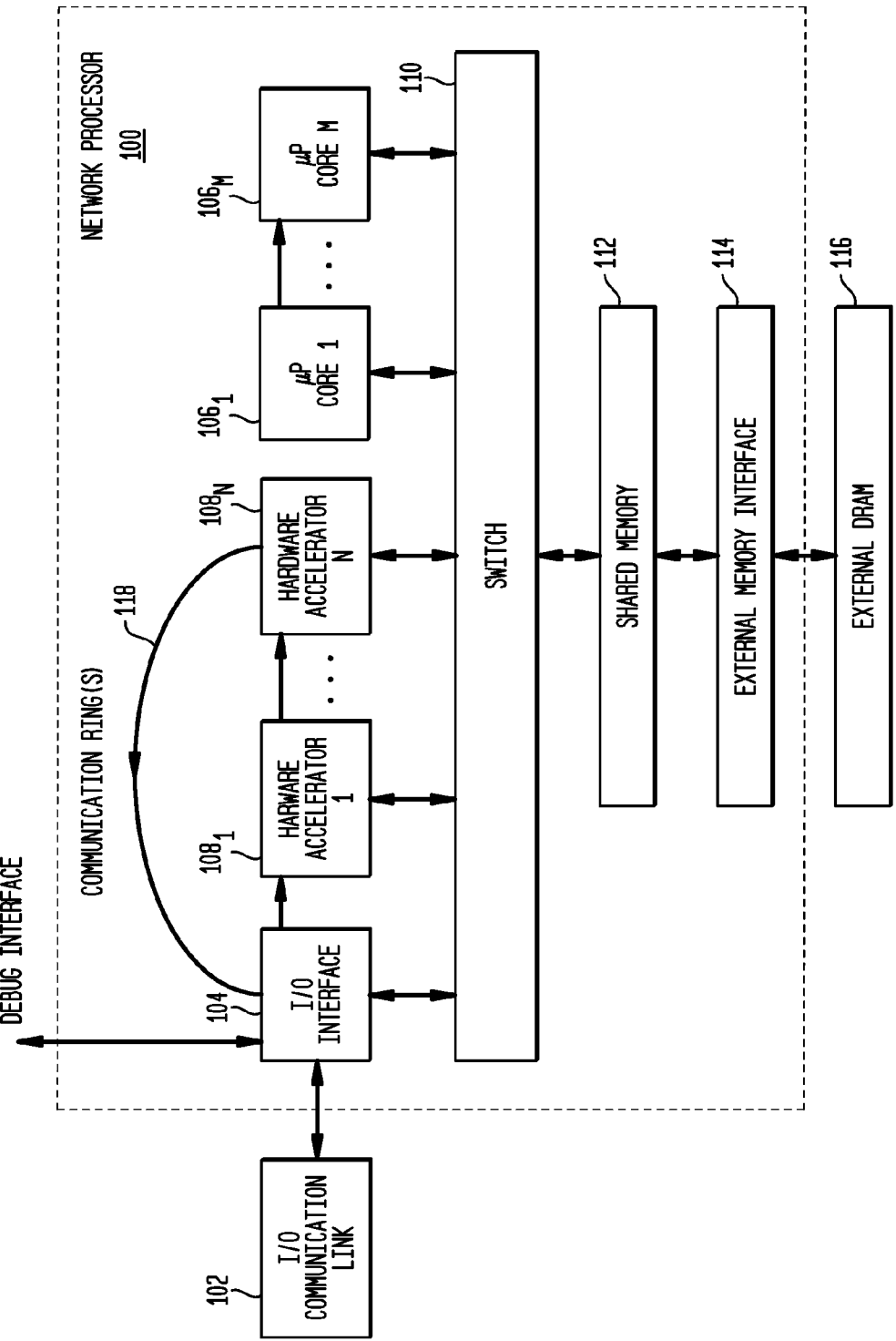
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled through switch 110 to shared memory 112. Switch 110 might be implemented as a non-blocking crossbar switch such as described in related U.S. patent application Ser. Nos. 12/430,438 filed Apr. 27, 2009, 12/729,226 filed Mar. 22, 2010, and 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not currently in use by the various μP cores 106 and hardware accelerators 108 to free space in shared memory 112. Hardware accelerators 108 might interact with each other, for example, by one or more communication bus rings 118 that pass "tasks" from a source core to a destination core. As described herein, tasks are instructions to the destination core to perform certain functions, and a task might contain address pointers to data stored in shared memory 112, as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

I/O interface 104 might also include one or more debug interfaces for interfacing with, for example, development tools of users of network processor 100, such as a debugger operating in compliance with a Joint Test Action Group (JTAG) interface, a Serial Wire Debug (SWD) interface, or miscellaneous interfaces such as Serial Peripheral Interface (SPI), a Serial Line Internet Protocol (SLIP) interface or a Universal Asynchronous Receiver/Transmitter (UART). Alternatively, debugging operations might be received via standard communications interfaces, such as a SCSI protocol bus, a SAS protocol bus, a SATA protocol bus, a USB bus, an Ethernet link, an IEEE 802.11 link, an IEEE 802.15 link, an IEEE 802.16 link, a PCI-E link, an SRIO, or other similar interfaces.

The various μP cores 106 and hardware accelerators 108 of network processor 100 might include several exemplary types of processors or accelerators. For example, the various μP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. Nos. 13/232,422, filed Sep. 14, 2011 and 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. Nos. 7,439,652 and 7,899,904, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010, which is incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, which is incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. Nos. 12/974,477 filed Dec. 21, 2010, 12/975,823, 12/975,880, 12/976,045, and 12/976,228 all filed Dec. 22, 2010, which are incorporated by reference herein. The MPP might also include hash functionality such as described in related U.S. patent application Ser. Nos. 13/046,717, 13/046,719, and 13/046,726 all filed Mar. 12, 2011, which are incorporated by reference herein.

Figure 2:
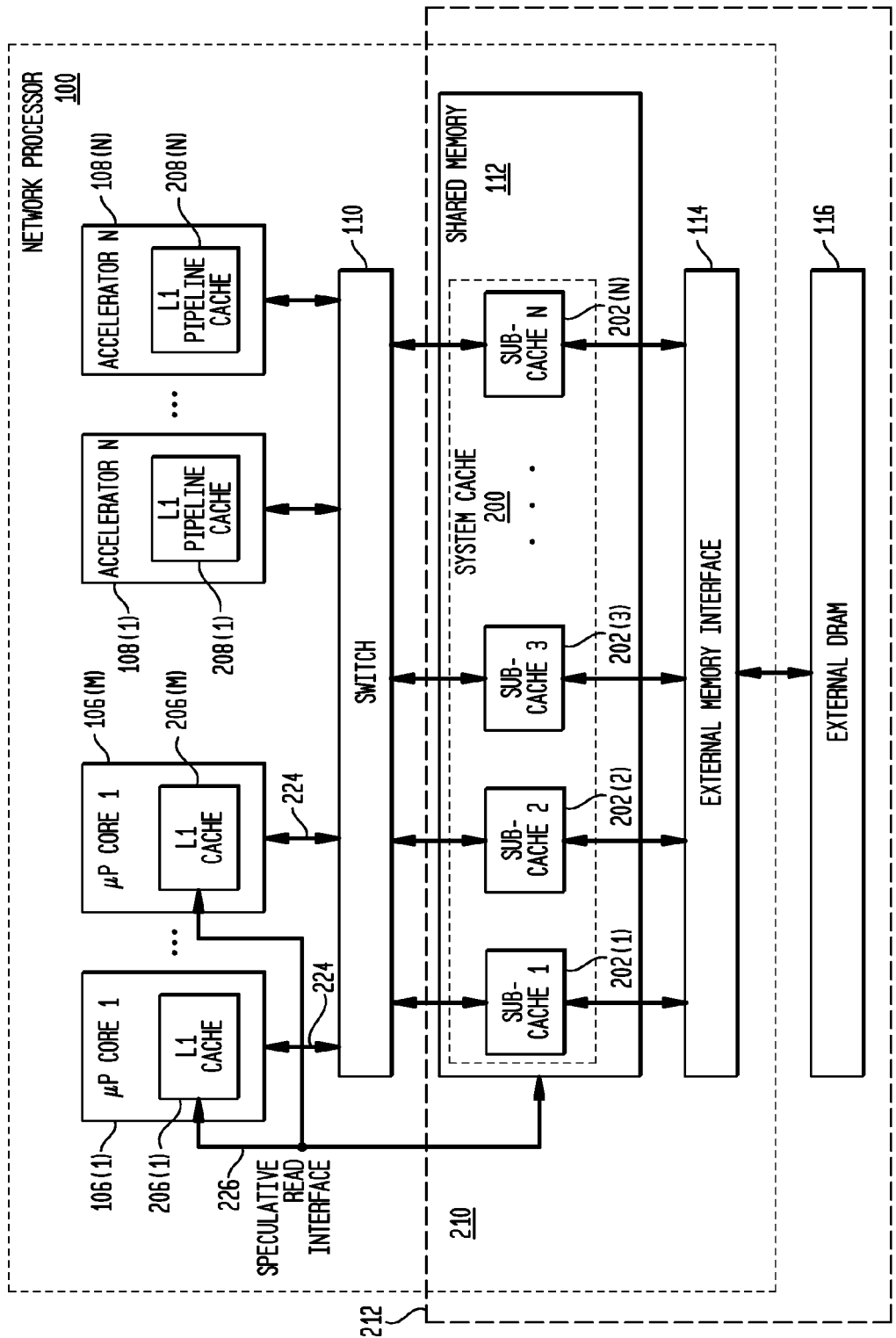
FIG. 2 shows a block diagram of a system cache of the network processor of FIG. 1, in accordance with embodiments of the present invention.

FIG. 2 shows a block diagram of an exemplary embodiment of system cache 200 of network processor 100, in accordance with embodiments of the present invention. As shown in FIG. 2, system cache 200 might be implemented in shared memory 112. System cache 200 might include one or more individual caches, shown as caches 202(1)-202(N). Caches 202(1)-202(N) might be employed to cache data from any µP core or accelerator (e.g., µP cores 106 or accelerators 108) of network processor 100. In particular embodiments, system cache 200 might be employed to store packet data from µP cores 106 or accelerators 108. As described in related U.S. patent application Ser. Nos. 12/782,379, 12/782,393, and 12/782,411, which are incorporated by reference herein, caches 202(1)-202(N) might be addressed via switch 110 in such a way as to balance access to the caches, referred to herein as striping, helping to avoid hot spots in shared memory 112, improve performance of the caching in and out of external memory 116, and reduce cache access bottlenecks. As indicated by dashed line 212, shared memory 112 and external memory 116 might generally be referred to as system memory 210. In embodiments of the present invention, each cache 202(1)-202(N) might form a memory array, and the number of system caches might preferably be implemented as a power of two. One or more memory blocks might be allocated to each cache 202(1)-202(N). In embodiments of the present invention, each cache 202(1)-202(N) might be implemented as an N-way associative cache employing a least recently used (LRU) caching algorithm. In some embodiments, each cache 202(1)-202(N) might have a total size of 512 kB and a cache line length of 256B.

As shown in FIG. 2, each of µP cores 106 might typically have a corresponding level one (L1) cache, shown as L1 caches 206(1)-206(M). Each of µP cores 106 might also include a level two (L2) cache (not shown). Such L1 and L2 caches might be implemented in accordance with the processor design of each µP core 106, for example a Power PC® processor implementation. The various µP cores 106 might be in communication with one another via a communication bus of network processor 100, for example, a Processor Local Bus (PLB), which is a microprocessor bus architecture introduced by IBM, or an Advanced eXtensible Interface (AXI), which is a higher frequency implementation of the Advanced Microcontroller Bus Architecture (AMBA) introduced by ARM Ltd. Also as shown in FIG. 2, one or more of accelerators 108 might have one or more corresponding local L1 pipeline caches, shown as L1 pipeline caches 208(1)-208(N). The function of L1 pipeline caches 208(1)-208(N) is to act as an interface to system cache 200 for accelerators 108 of network processor 100. The term "pipeline" is used since L1 pipeline caches 208(1)-208(N) might typically be employed only for certain ones of accelerators 108 that access system cache 200 as part of an execution pipeline. The operation of system cache 200, shared memory 112 and external memory 116 might be substantially as described in related U.S. patent application Ser. Nos. 13/192,104, 13/192,140 and 13/192,187, all filed Jul. 27, 2011, which are incorporated by reference herein.

Figure 3:
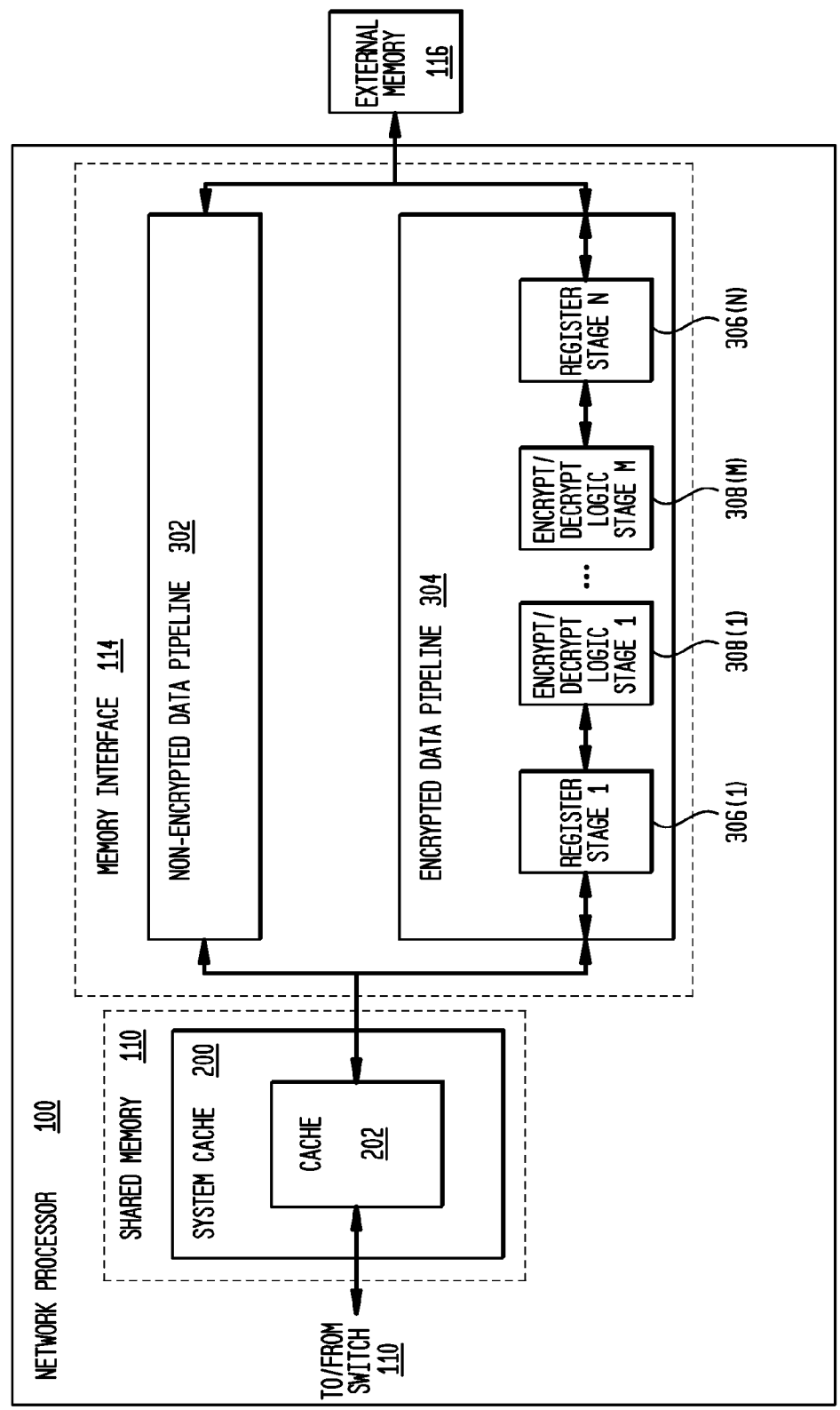
FIG. 3 shows a block diagram of a memory interface of the system cache of FIG. 2, in accordance with embodiments of the present invention.

FIG. 3 shows a block diagram of memory interface 114 of network processor 100. As shown in FIG. 3, memory interface 114 might include non-encrypted data pipeline 302 and encrypted pipeline 304 between system cache 200 and external memory 116. Encrypted data pipeline 304 might be optionally employed to encrypt and decrypt data that is transferred between external memory 116 and system cache 200. Some embodiments of encrypted data pipeline 304 might selectably employ one or more encryption/decryption methods such as, for example, *Specification for the Advanced Encryption Standard (AES)*, Federal Information Processing Standard (FIPS) Publication 197, (2001), published by the National Institute of Standards and Technology (NIST), or other encryption and decryption methods. Due to timing requirements for encrypting and decrypting data, encrypted data pipeline 304 might include one or more register stages, shown as register stages 306(1)-306(N), to buffer data as it is encrypted or decrypted by one or more encryption/decryption logic stages, shown as logic stages 308(1)-308(M), where N and M are positive integers.

Embodiments of the present invention might perform encryption for all addresses within external memory 116, or for one or more programmable regions of the full address space of external memory 116. Thus, some data transfer operations between system cache 200 and external memory 116 might be encrypted, while others are not encrypted, during standard operation of network processor 100. If data corresponding to a given data transfer operation is to be encrypted or decrypted, the data transfer operation is provided to encrypted data pipeline 304, otherwise, the data transfer operation is provided to non-encrypted data pipeline 302, which might operation relatively faster than encrypted data pipeline 304, thus reducing access latency of external memory 116 for non-encrypted data transfers. In some embodiments, if encrypted data pipeline 304 is non-empty (e.g., encrypted data pipeline 304 is processing an encrypted data transfer operation), then non-encrypted operations might be stalled until the encrypted data transfer completes, for example by still providing the non-encrypted data transfer operation to encrypted data pipeline 304.

Embodiments of the present invention provide debugging features for systems that employ data encryption and decryption, such as shown in FIG. 3. As shown in FIG. 3, encryption and decryption of data typically involves introduction of additional pipeline and control structures (e.g., encrypted data pipeline 304) that might alter the overall flow of data, possibly limiting debugging options for such operations. Further, a typical component of encryption and data security implementations in a SoC is to limit external access to on-chip resources, including debug resources, once security is enabled. The combination of data encryption and the other security measures might make it very difficult to debug a problem in a running system. Typical debugging operations might simply disable encryption and decryption. However, if security is disabled for debugging operations, the SoC might operate differently. For example, if encryption is disabled for a debugging operation, the SoC might employ non-encrypted data pipeline 302 rather than encrypted data pipeline 304. Processing modules or state machines of network processor 100 that might perform differently based on whether encryption is enabled or disabled might also function differently during debugging operations. Thus, differences in the observable behavior of the SoC might make diagnosing, identifying and correcting development problems with the SoC difficult when encryption is enabled.

Figure 4:
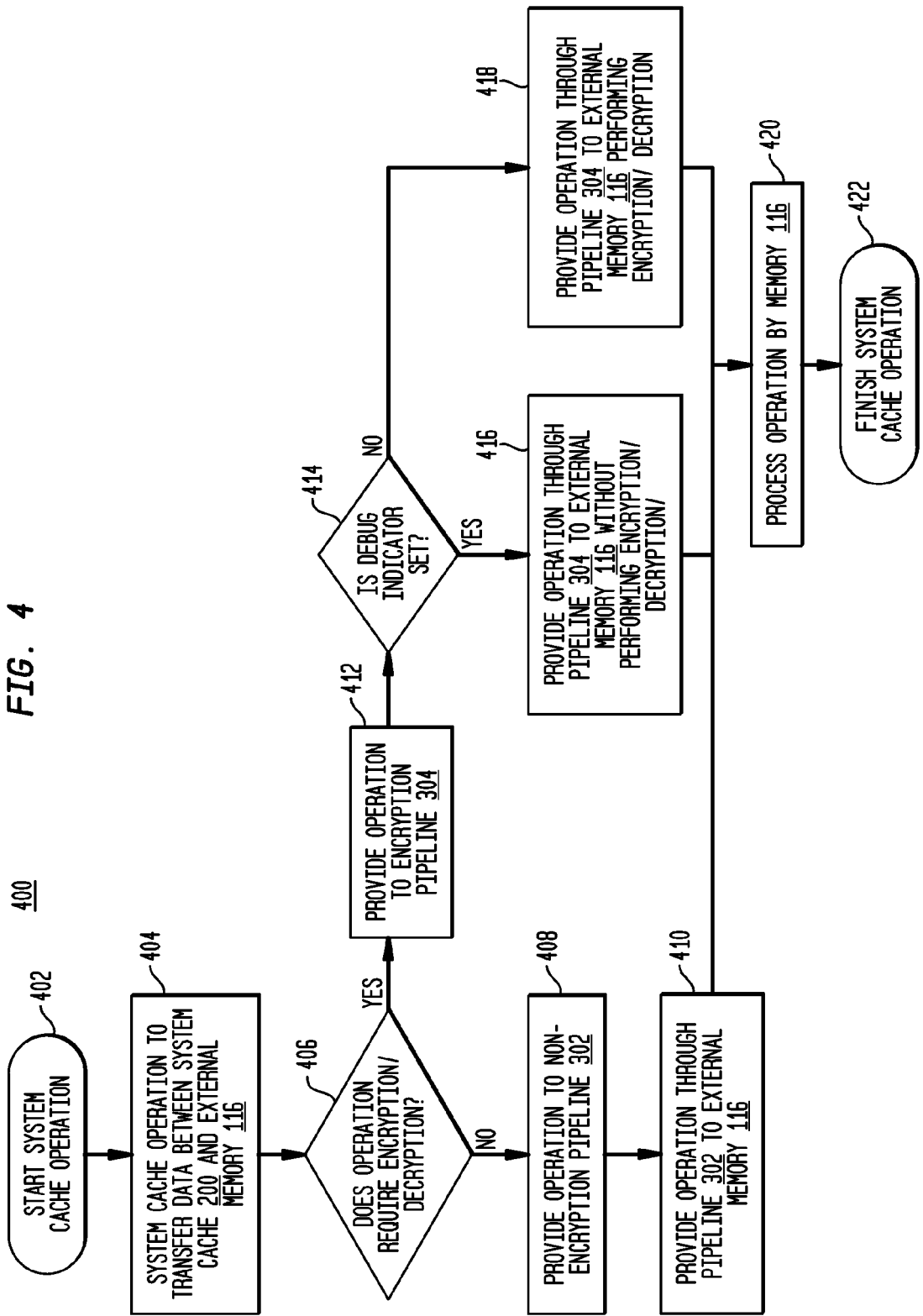
FIG. 4 shows an exemplary flow diagram of a system cache memory access process of the system cache of FIG. 2.

FIG. 4 shows an exemplary flow diagram of the operation of memory interface 114, for example in processing a data transfer operation between system cache 200 and external memory 116. At step 402, system cache 200 begins operation, for example at power up of network processor 100. At step 404, system cache 200 initiates a data transfer operation with memory interface 114 for external memory 116, for example to read data from external memory 116 for storage in system cache 200, or to write data from system cache 200 to external memory 116. At step 406, memory interface 114 determines whether the data transfer operation requires encryption (e.g., to write to external memory 116) or decryption (e.g., to read from external memory 116).

If, at step 406, the data transfer operation requires encryption or decryption, the data transfer operation is provided to encrypted data pipeline 304 at step 412. At step 414, encrypted data pipeline 304 determines whether the data transfer operation corresponds to a debugging operation, or if the data transfer operation corresponds to a normal data transfer operation of network processor 100. At step 414, if the data transfer operation corresponds to a normal data transfer operation of network processor 100, at step 418 the data transfer operation is provided to external memory 116, and data encryption (e.g., for write operations to external memory 116) or decryption (e.g., for read operations from external memory 116) is performed for the data transfer at step 420. Once the data transfer is complete between system cache 200 and external memory 116, system cache operation 400 completes at step 422.

Otherwise, if, at step 414 the data transfer operation corresponds to a debugging operation, at step 416 the debugging operation is provided to encrypted data pipeline 304. Encrypted data pipeline 304, at each of logic stages 308, determines that the operation is a debugging operation and bypasses actually performing encryption or decryption of the data transfer operation, but still passing the data transfer operation through each of register stages 306 and logic stages 308. Various stage machines of encrypted data pipeline 304 operate substantially similarly regardless of whether encryption is enabled.

If, at step 406, the data transfer operation does not require encryption or decryption, the data transfer operation is provided to non-encrypted data pipeline 302 at step 408. In some embodiments, at step 406, if encrypted data pipeline 304 is non-empty (e.g., encrypted data pipeline 304 is processing an encrypted data transfer operation), then non-encrypted operations might be stalled until the encrypted data transfer completes, for example by still providing the non-encrypted data transfer operation to encrypted data pipeline 304. At step 410, the data transfer operation is provided to external memory 116 via non-encrypted data pipeline 302. At step 420, the data transfer operation is processed by external memory 116, for example, by writing non-encrypted data to external memory 116, or by providing non-encrypted data from external memory 116 to non-encrypted data pipeline 302. Once the data transfer completes between system cache 200 and external memory 116, system cache operation 400 completes at step 422.

The one or more indicators employed at steps 406 and 414 might be implemented as one or more indicator bit flags of control data for each corresponding data transfer operation. For example, some embodiments might employ a debug indicator bit flag that, when set, indicates that the corresponding data transfer operation is a debugging operation, and an encryption or security bit flag that, when set, indicate that encryption or other security measures are to be employed for the data transfer operation.

Thus, described embodiments provide substantially the same data flow for data transfer operations between system cache 200 and external memory 116 regardless of whether the operation is a debugging operation or a standard operation of network processor 100. Thus, the data flow can be substantially duplicated whether encryption is enabled or disabled as part of an overall security plan of network processor 100 since the pipeline data flows are substantially similar (e.g., through the corresponding one of pipelines 302 and 304), and the one or more corresponding state machines operate substantially similarly regardless of the operation being a debugging operation or not. Although debugging operations might not perform actual data encryption and decryption, the various register stages 306 and logic stages 308 process a debugging operation substantially similarly as a non-debugging operation.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of coordinating debugging operations in a network processor coupled to a network, the network processor having a plurality of processors coupled by at least one ring bus, the method comprising:
    at least one of the plurality of processors configured to generate one or more task messages corresponding to data packets received from the network;
    by each processor:
        sending a task message over the unidirectional ring bus to an adjacent processor coupled to the ring bus, the task message having a corresponding one or more destination processors;
        checking, upon receiving a task message, whether the processor is a destination processor for the task message and, if not, pass the task message unchanged to a next adjacent processor coupled to the ring bus, whereby the task message is passed from the source processor to each corresponding destination processor on the ring bus;
        reading from the task message, if the processor is a destination processor for the task message, an address of data in a system cache of the network processor to be accessed by the destination processor;
        requesting, by the destination processor, data corresponding to the received task from the system cache;
        determining, by the system cache, whether the requested data is stored in the system cache;
        if the data is not stored in the system cache:
            requesting a data transfer from the at least one external memory for the requested data;
    selecting, by a memory interface of the network processor, an encrypted data pipeline or a non-encrypted data pipeline based on whether the processed data transfer request includes an encrypted operation;
    providing the data transfer to the encrypted data pipeline if the data transfer request includes the encrypted operation; and
    checking a debug indicator for the data transfer request, wherein, if the debug indicator is set:
        disabling encryption/decryption of the encrypted data pipeline; and
        performing the data transfer request by the encrypted data pipeline to the at least one external memory, thereby providing the requested data to the destination processor;
    wherein, by having at least one of the processors receive a task message, execute a task, and provide a subsequent task message to a subsequent processor based on the received data packet, a virtual pipeline is defined for processing the received data packet, the virtual pipeline defining a flow order for each task message through one or more of the plurality of processors, and wherein each task message comprises a field indicating one of the plurality of virtual pipelines through which the task message is processed.

2. The method of claim 1, wherein:
if the debug indicator is not set:
    enabling encryption/decryption of the encrypted data pipeline; and
    performing the data transfer request by the encrypted data pipeline to the at least one external memory.

3. The method of claim 1, further comprising:
providing the data transfer to the non-encrypted data pipeline if the encrypted operation is absent from the data transfer request; and
performing the data transfer request by the non-encrypted data pipeline to the at least one external memory.

4. The method of claim 1, further comprising:
setting, by a control processor of the one or more processors of the network processor, one or more address regions of the at least one external memory as encrypted regions.

5. The method of claim 4, wherein the step of selecting, by a memory interface of the network processor, an encrypted data pipeline or a non-encrypted data pipeline based on whether the processed data transfer request includes an encrypted operation, further comprises:
    determining, by the memory interface, whether the data transfer request corresponds to an encrypted region of the at least one external memory.
6. The method of claim 4, wherein the one or more address regions comprise all addresses of the at least one external memory.
7. The method of claim 1, wherein:
    if the data transfer request is a write operation from the system cache to the at least one external memory, an encryption operation of the encrypted data pipeline comprises:
        a data encryption operation; and
    if the requested data transfer is a read operation from the at least one external memory to the system cache, the encryption operation of the encrypted data pipeline comprises:
        a data decryption operation.
8. The method of claim 1, further comprising:
    receiving a debugging operation from a debugging source coupled to a debug interface of the network processor, wherein the debug interface comprises at least one of a Joint Test Action Group (JTAG) interface, a Serial Wire Debug (SWD) interface, a Serial Peripheral Interface (SPI), a Serial Line Internet Protocol (SLIP) interface and a Universal Asynchronous Receiver/Transmitter (UART).
9. The method of claim 1, wherein the network processor is coupled to at least one of a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, and a Serial Rapid I/O ("SRIO") link.
10. A non-transitory machine-readable medium, having encoded thereon program code, wherein, when the program code is executed by a machine, the machine implements a method of coordinating debugging operations in a network processor coupled to a network, the network processor having a plurality of processors coupled by at least one ring bus, the method comprising:
    at least one of the plurality of processors configured to generate one or more task messages corresponding to data packets received from the network;
    by each processor:
        sending a task message over the unidirectional ring bus to an adjacent processor coupled to the ring bus, the task message having a corresponding one or more destination processors;
        checking, upon receiving a task message, whether the processor is a destination processor for the task message and, if not, pass the task message unchanged to a next adjacent processor coupled to the ring bus, whereby the task message is passed from the source processor to each corresponding destination processor on the ring bus;
        reading from the task message, if the processor is a destination processor for the task message, an address of data in a system cache of the network processor to be accessed by the destination processor;
        requesting, by the destination processor, data corresponding to the received task from the system cache;
        determining, by the system cache, whether the requested data is stored in the system cache;
        if the data is not stored in the system cache:
            requesting a data transfer from the at least one external memory for the requested data;
    selecting, by a memory interface of the network processor, an encrypted data pipeline or a non-encrypted data pipeline based on whether the processed data transfer request includes an encrypted operation;
    providing the data transfer to the encrypted data pipeline if the data transfer request includes the encrypted operation; and
    checking a debug indicator for the data transfer request, wherein, if the debug indicator is set:
        disabling encryption/decryption of the encrypted data pipeline; and
        performing the data transfer request by the encrypted data pipeline to the at least one external memory, thereby providing the requested data to the destination processor;
    wherein, by having at least one of the processors receive a task message, execute a task, and provide a subsequent task message to a subsequent processor based on the received data packet, a virtual pipeline is defined for processing the received data packet, the virtual pipeline defining a flow order for each task message through one or more of the plurality of processors, and wherein each task message comprises a field indicating one of the plurality of virtual pipelines through which the task message is processed.
11. The non-transitory machine-readable medium of claim 10, wherein:
    if the debug indicator is not set:
        enabling encryption/decryption of the encrypted data pipeline; and
        performing the data transfer request by the encrypted data pipeline to the at least one external memory.
12. The non-transitory machine-readable medium of claim 10, further comprising:
    providing the data transfer to the non-encrypted data pipeline if the encrypted operation is absent from the data transfer request; and
    performing the data transfer request by the non-encrypted data pipeline to the at least one external memory.
13. The non-transitory machine-readable medium of claim 10, wherein the step of selecting, by a memory interface of the network processor, an encrypted data pipeline or a non-encrypted data pipeline based on whether the processed data transfer request includes an encrypted operation, further comprises:
    setting, by a control processor of the one or more processors of the network processor, one or more address regions of the at least one external memory as encrypted regions;
    determining, by the memory interface, whether the data transfer request corresponds to an encrypted region of the at least one external memory,
    wherein if the data transfer request is a write operation from the system cache to the at least one external memory, an encryption operation of the encrypted data pipeline comprises:
        a data encryption operation; and
    wherein if the requested data transfer is a read operation from the at least one external memory to the system cache, the encryption operation of the encrypted data pipeline comprises:
        a data decryption operation.
14. The non-transitory machine-readable medium of claim 10, further comprising:

receiving a debugging operation from a debugging source coupled to a debug interface of the network processor, wherein the debug interface comprises at least one of a Joint Test Action Group (JTAG) interface, a Serial Wire Debug (SWD) interface, a Serial Peripheral Interface (SPI), a Serial Line Internet Protocol (SLIP) interface and a Universal Asynchronous Receiver/Transmitter (UART).

15. A network processor comprising:

a plurality of processors coupled by at least one ring bus, a system cache, and at least one external memory;

a control processor configured to (i) set one or more address regions of the at least one external memory as encrypted regions, and (ii) generate one or more task messages corresponding to data packets received from a communication link;

a debug interface configured to receive debugging operations from a debugging source;

the communication link configured to receive one or more packets, wherein data corresponding to each received packet is stored in at least one of the system cache and the at least one external memory;

each of the plurality of processors configured to:
  send a task message over the unidirectional ring bus to an adjacent processor coupled to the ring bus, the task message having a corresponding one or more destination processors;
  check, upon receiving a task message, whether the processor is a destination processor for the task message and, if not, pass the task message unchanged to a next adjacent processor coupled to the ring bus, whereby the task message is passed from the source processor to each corresponding destination processor on the ring bus;
  read from the task message, if the processor is a destination processor for the task message, an address of data in a system cache of the network processor to be accessed by the destination processor;
  request, by the destination processor, data corresponding to the received task from the system cache;

the system cache configured to:
  determine whether the requested data is stored in the system cache;
  if the data is not stored in the system cache:
    request a data transfer from the at least one external memory for the requested data;

a memory interface configured to:
  process the request from the system cache for a data transfer between the system cache and the at least one external memory;
  select an encrypted data pipeline or a non-encrypted data pipeline based on whether the processed data transfer request includes an encrypted operation;
  provide the data transfer to the encrypted data pipeline if the data transfer request includes the encrypted operation;
  check a debug indicator for the data transfer request, wherein, if the debug indicator is set:
    disable encryption/decryption of the encrypted data pipeline; and
    perform the data transfer request by the encrypted data pipeline to the at least one external memory;
  if the debug indicator is not set:
    enable encryption/decryption of the encrypted data pipeline; and
    perform the data transfer request by the encrypted data pipeline to the at least one external memory;
  provide the data transfer to the non-encrypted data pipeline if the encrypted operation is absent from the data transfer request; and
  perform the data transfer request by the non-encrypted data pipeline to the at least one external memory, thereby providing the requested data to the destination processor, wherein, by having at least one of the processors receive a task message, execute a task, and provide a subsequent task message to a subsequent processor based on the received data packet, a virtual pipeline is defined for processing the received data packet, the virtual pipeline defining a flow order for each task message through one or more of the plurality of processors, and wherein each task message comprises a field indicating one of the plurality of virtual pipelines through which the task message is processed.

16. The network processor of claim 15, wherein:

the communication link comprises at least one of a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, and a Serial Rapid I/O ("SRIO") link; and the debug interface comprises at least one of a Joint Test Action Group (JTAG) interface, a Serial Wire Debug (SWD) interface, a Serial Peripheral Interface (SPI), a Serial Line Internet Protocol (SLIP) interface and a Universal Asynchronous Receiver/Transmitter (UART).

17. The network processor of claim 15, wherein:

the one or more one or more processing modules comprise at least one of: control processors comprising Reduced Instruction Set Computing (RISC) central processing units (CPUs) and hardware accelerators;

the system cache comprises an embedded DRAM; and the at least one external memory comprises a DRAM coupled to the network processor.

18. The network processor of claim 15, wherein the network processor is implemented as an integrated circuit chip.

* * * * *